April 2, 1968  F. A. DONALD  3,375,951
TANK WAFER
Filed June 24, 1965
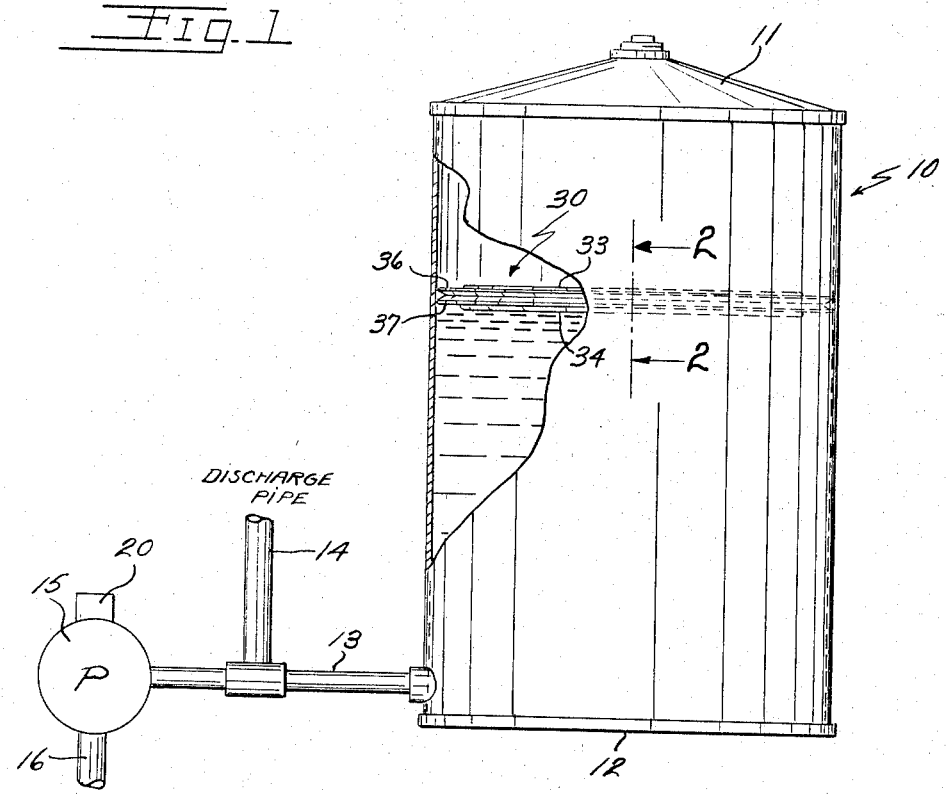
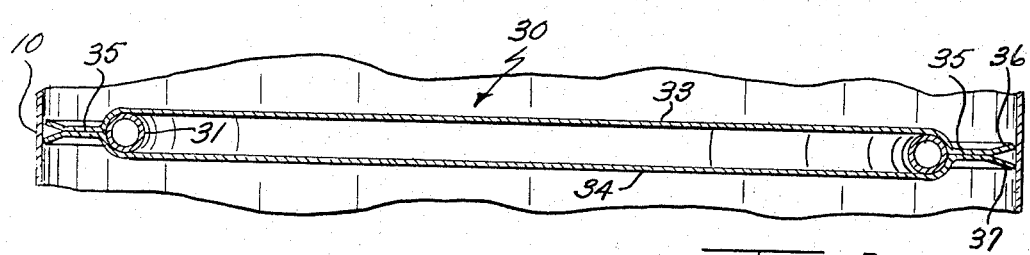
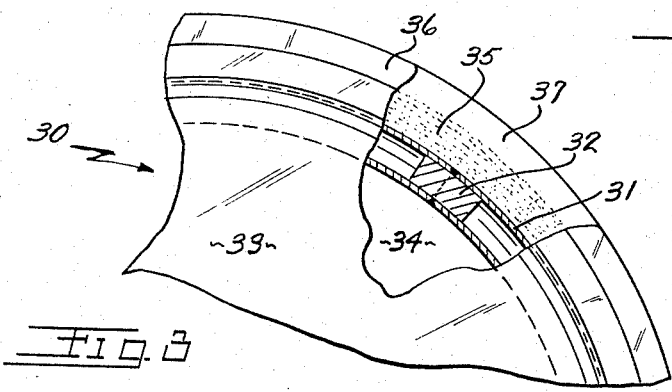
INVENTOR
FORREST A. DONALD
BY
Meyer, Baldwin, Doran & Egan
ATTORNEYS form# United States Patent Office 3,375,951
Patented Apr. 2, 1968

3,375,951
TANK WAFER
Forrest A. Donald, Mansfield, Ohio, assignor to Barnes Manufacturing Co., Mansfield, Ohio, a corporation of Ohio
Filed June 24, 1965, Ser. No. 466,720
1 Claim. (Cl. 220—26)

ABSTRACT OF THE DISCLOSURE

This invention relates generally to water supply tanks used in independent water supply systems wherein the water is circulated by means of an air head maintained within the tank. More particularly, the present invention is directed to a tank wafer or float for preventing the absorption of air by the water in a pneumatically pressurized water tank.

---

In a pressurized tank of the above type, there is a tendency for some of the air to dissolve in the water, thereby dissipating the air head. One method of reducing this dissipating effect is to provide a flat, partition-like float element which conforms generally to the inner cross sectional shape of the tank and floats upon the water in the tank. It is a primary object of the present invention to provide a novel and improved float element, hereinafter referred to as a tank wafer, which is characterized by simplicity of construction, ease of manufacture, and the particularly effective manner in which it performs its function.

Another object is to provide a tank wafer of the above type which is nonrigid in construction.

Still another object is to provide such a tank wafer comprising a tubular annulus of hollow construction supporting resilient sheet material stretched thereacross.

Yet another object is to provide a tank wafer having the above features wherein layers of said sheet material are provided on either side of the annulus.

A further object is to provide a tank wafer having a resilient peripheral edge means which may be disposed closely adjacent to or lightly in contact with the inner surface of the tank.

Other objects and advantages of the invention and the invention itself will be set forth in the following description, reference being made throughout to the accompanying drawings.

FIG. 1 of the drawings shows a semidiagrammatic view of a water supply system of the type referred to.

FIG. 2 is a diametric cross section of the tank wafer of this invention, taken along the line 2—2 of FIG. 1.

FIG. 3 is a top plan view, partially in section, of a peripheral portion of the wafer of FIG. 2.

Referring now to FIG. 1 of the drawings, a typical water supply system in which the present invention has utility comprises a preferably cylindrical water tank 10 disposed on a vertical axis and having typical upper and lower, enclosing end walls 11 and 12, respectively. Adjacent to the bottom of the tank 10, there are provided an inlet pipe 13. The inlet pipe 13 connects the tank 10 to a pump 15 which said pump, in turn, is connected to a supply line 16. Said supply line connects the pump 15 to a suitable water supply such as a well, cistern, or reservoir (not herein illustrated).

A discharge line 14 is connected by T 17 into inlet pipe 13 whereby discharge water may be supplied from said tank system to a suitable area of use such as a residence or the like.

The pump 15 may comprise any conventional pumping apparatus or combination of pumping devices and is adapted to pump water from the supply line 16 through the inlet pipe 13 and into the tank 10.

Water is taken from the tank 10 through the discharge pipe 14, and its flow may be controlled by valve means not shown which may represent any suitable valve or faucet or plurality thereof in, for example, a dwelling house.

A pressure limit switch 20 is connected to the pump 15 and is operable to start and stop the pump 15 in response to predetermined air pressures corresponding to the air pressure head within said tank. For example, in a typical system the limit switch 20 would start the pump 15 for pumping water if the pressure above the water in the tank drops below twenty pounds and would stop said pump if the pressure exceeds forty pounds. Thus, a relatively constant pressure is maintained in the tank at all times. Other well-known control means, not herein illustrated, may be utilized to maintain a minimum amount of water within the tank 10.

The tank wafer of this invention is shown at 30 in FIG. 1 floating flatwise upon the upper surface of the water within the tank 10. Referring to the details of FIGS. 2 and 3, said tank wafer comprises a floatable edge support frame in the form of a tubular annulus 31 which is made from a length of suitable plastic tubing. The circumferentially directed ends of the tubing are sealed and connected by a plug 32 (FIG. 3) which is secured to the tubing by a suitable adhesive or bonding material. As herein illustrated, the annulus 31 is made from a polypropylene plastic having a diameter of 5/8" and a wall thickness of .040". The plug 32 may be made of a similar plastic or other material which will bond readily to said annulus.

The annulus 31 is sandwiched in between and supports two layers 33 and 34 of sheet plastic material. Said layers are stretched firmly across the annulus and are heat sealed together radially outwardly of said annulus to form a circumferential rim indicated at 35. The sheet material extends radially outwardly beyond the heat sealed rim 35 and affords a pair of circumferentially continuous, flexible lips 36 and 37, the lip 36 being integral with the upper layer 33 and the lip 37 being integral with the bottom layer 34.

In the present embodiment, the layers 33 and 34 are preferably made of a vinyl plastic or other suitable flexible plastic material having a thickness of .020". The entire wafer is very light in weight, and due to the inherent characteristics of the material suggested, is quite resilient. It will be noted that the annulus 31 is substantially smaller in diameter than the inner wall surface of the tank 10, and it will be further noted that the rim 35 is also disposed inwardly from said tank wall. Only the flexible lips 36 and 27 extend radially outwardly to, or substantially to, the inner wall of said tank and creates a soft wiping action against said inner tank wall. Because of the extreme flexibility of the lips, the tank wafer 30 substantially seals off the air from the water in the tank without danger of said wafer binding against the tank wall. The flexible nature of said wafer also enables it to accommodate readily to any surging or turbulence within the tank without damage to the wafer or binding thereof. As the air head in the tank 10 builds up, the layers 33 and 34 can flexible downwardly in response thereto, and any air trapped below the bottom layer 34 can readily escape around the edges of the lips 36 and 27. At the same time, water disposed above the tank wafer 30 can easily flow downwardly therebelow past the resilient lips 36 and 37.

It will be understood that many changes in the details of the invention as herein described and illustrated may be made without, however, departing from the spirit thereof or the scope of the appended claim.

What is claimed is:

1. A tank wafer for separating air from water inside a pneumatically pressurized tank, said wafer comprising a sealed, tubular edge support frame disposed in a plane; said frame disposed between two layers of sheet material, said material being stretched taut in spaced relation to each other across both faces of said frame; said layers extending outwardly beyond said frame and sealed to each other just outwardly of said frame to provide a sealed rim around said frame; each of said layers extending outwardly beyond said rim to provide a pair of separate and continuous lips around said rim adapted to engage the wall of said tank in spaced relation to each other.

References Cited
UNITED STATES PATENTS

| | | | |
|---|---|---|---|
| 2,014,264 | 9/1935 | Patrick | 220—26 |
| 2,531,424 | 11/1950 | Goldsby et al. | 220—26 |
| 2,847,142 | 8/1958 | McClintock et al. | 220—26 |
| 2,870,455 | 1/1959 | Reeves | 220—26 |
| 3,049,261 | 8/1962 | Wade et al. | 220—26 |
| 3,159,301 | 12/1964 | Anderson | 220—26 |

THERON E. CONDON, *Primary Examiner.*

JAMES R. GARRETT, *Examiner.*